United States Patent Office 2,778,148
Patented Jan. 22, 1957

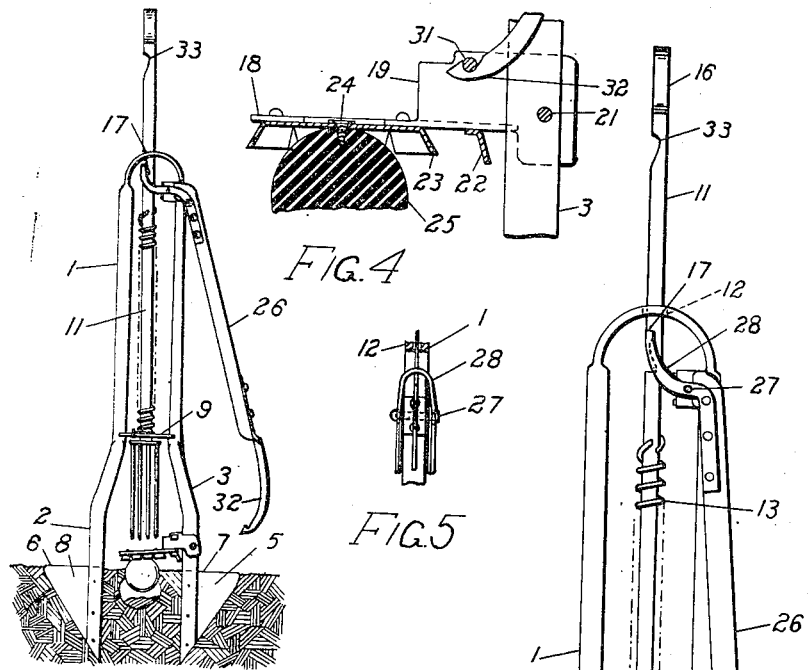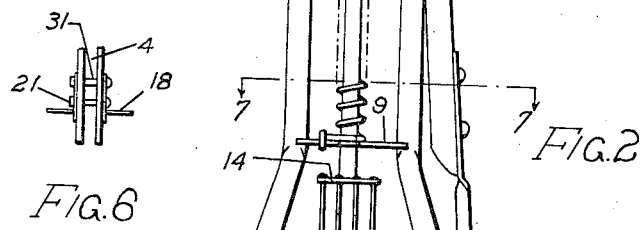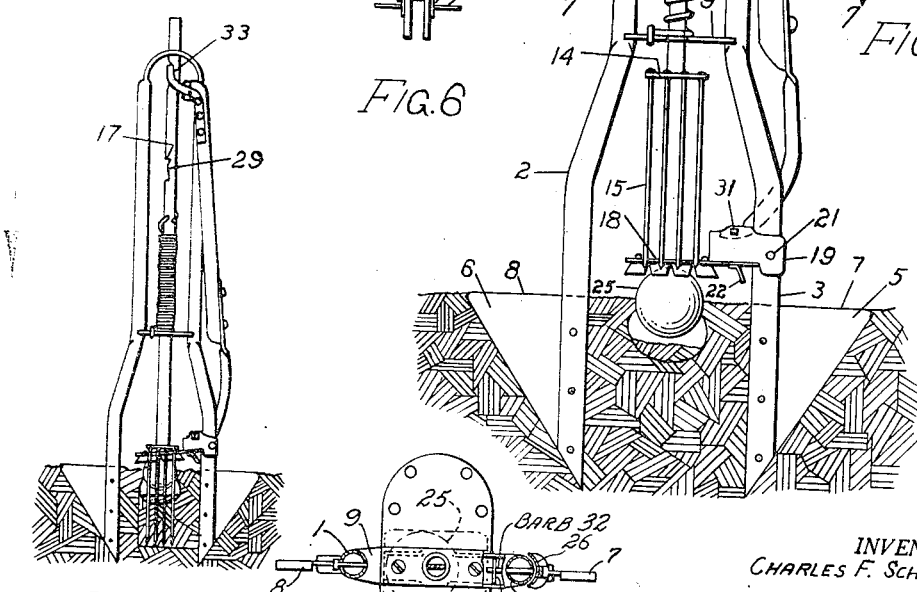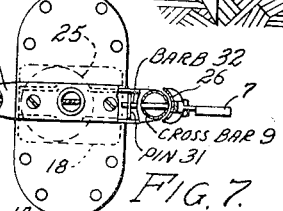

2,778,148

MOLE TRAP

Charles F. Schmidt, Jeffersontown, Ky.

Application March 9, 1953, Serial No. 340,947

2 Claims. (Cl. 43—80)

The present invention relates to a trap for trapping moles in their burrows, and relates in particular to an improved trigger mechanism for such traps.

The types of mole traps commercially available employ various means to catch or hold the mole, such as impaling spikes, loops, and the like, and employ various trigger mechanisms to actuate the trap. Although the trigger mechanisms employed in such traps are in and of themselves sensitive, in practical operation they have certain disadvantages. The mole will avoid any hard or metallic object in his burrow or path, so that traps which employ triggers of this type in the burrow fail because the mole avoids the trigger. A trigger buried in earth is not sensitive because of the resistance of the earth to the movement of the trigger. Another type of trap, as exemplified by Patents 689,324 and 2,086,826, employs a trigger plate that bears on the earth over the burrow of the mole, and is actuated by the raising of the earth as the mole roots under the trigger. This arrangement requires skill in setting the trap to insure firm contact of the trigger with the earth, but even then is uncertain in action because the lifting of the earth by the mole may be dissipated so its action does not reach the trigger.

It is an object of this invention to provide a mole trap having a novel trigger mechanism which insures contact with the earth over the burrow of the mole.

Another object is the provision of a trap having a sensitive trigger mechanism combined with a strong spring action, so the trap will be effective in deep burrows.

Another object is the provision of a trigger mechanism which is easy to set and is adaptable for settings over deep or shallow burrows.

According to the present invention, I provide a trap having a trigger actuator in the form of an abutment adapted to overlie the surface of the earth above the mole burrow, and a movable spacer adapted to engage the underside of the abutment plate and the earth under the abutment. This spacer, because of its intimate contact with the earth and abutment, responds sensitively to any lifting action of the earth by the mole beneath it, and transmits this lifting action to the trigger actuating abutment which thus springs the trap. The mole holding mechanism may be in the form of impaling spikes, loops or other known forms of capturing devices, and upon springing of the trap captures the mole.

The preferred form of trigger mechanism comprises an abutment plate under which is located a light weight sphere, which may be attached to the plate. This sphere preferably is made of sponge rubber, as this type of spacer can be set directly in the burrow, but the spacer may be made of other light weight material, such as cork, wood, hollow rubber, celluloid, or the like. A spherical form is preferred, but the invention is not limited to this form of spacer.

Another feature of the invention comprises an improved releasable detaining mechanism which is easily released against a powerful force, but it will be understood that my trigger actuator above described may be employed in connection with various types of detaining mechanisms and various types of mole capturing mechanisms.

The invention will be described in greater detail in connection with the accompanying drawing illustrating a preferred embodiment by way of example and wherein:

Figure 1 illustrates a trap embodying the invention in one stage of setting;

Figure 2 shows the trap in set position;

Figure 3 shows the trap sprung;

Fig. 4 is a detailed sectional view of lower portion of the trigger mechanism and ball;

Fig. 5 is a detailed view of the top elements of the trigger mechanism;

Fig. 6 is an end view of the abutment plate and yoke with legs omitted; and

Fig. 7 is a view taken on line 7—7 of Fig. 2.

Referring to the drawing, there is shown a frame 1 in the form of an inverted U having offset legs 2 and 3. These legs preferably are split lengthwise to provide a slot 4 therein. The legs carry plows 5 and 6 suitably attached to the legs, as by rivets, and the top edges 7, 8 of the plows provide a foot rest so the operator can stand thereon to drive the plows into the ground by exerting his weight thereon. Or the plows may be driven into the ground by pounding thereon.

Above the tops of the plows is a cross bar 9 secured to the frame and a setting rod 11 extends through a suitable aperture 12 in the frame and an aperture in the cross bar. A tension spring 13 about the setting rod has one end anchored to the cross bar 9 and the other end anchored to the setting rod. At its lower end the setting rod has a plate 14 which carries any suitable number of spikes 15, arranged to straddle the trigger mechanism, as will hereinafter appear. A transverse handle 16 is formed on the top of rod 11. The rod 11 has a safety shoulder or detent 17 adapted to cooperate with the U frame at the aperture 12 to hold the setting rod 11 raised while the trigger is being set.

The trigger mechanism comprises an abutment plate 18 with a yoke 19 turned up at one end, and a pin 21 passing through the yoke hinges the plate to the leg 3 of the frame. One edge of plate 18 is bent downward at 22 to engage the leg 3, and thus limit downward pivotal movement of the plate. The plate 18 may have an invert cup shaped member 23 attached thereto, for a purpose to be presently described. A wood screw or other suitable pin 24 extending loosely through an opening in the base of cup 23 is driven into a ball 25 of sponge rubber so that the ball is loosely attached to cup 23. This insures against the ball becoming lost when the trap is stored, and the loose connection permits proper setting of the trap.

An elongated arm 26 is pivoted at 27 on a block secured to the frame, this pivot passing through a U-shaped extension 28 on the arm. On the setting rod, from the edge 17 an inclined cam surface 29 is cut out, and in set position with arm 26 adjacent the frame the extension 28 is received in this cutout portion. The yoke 19 carries a cross pin 31 and arm 26 carries a hook or barb 32 which in set position is engaged by pin 31 to hold the arm adjacent the frame with the extension 28 engaging the edge 17.

The operation of the invention now will be described. In setting the trap over a shallow burrow, a small hole is dug down into the burrow, and the trap is then positioned to straddle the burrow and the plows are driven into the ground until the ball 25 lies in the hole, and is pressed against the plate 18. The rod 11 is raised to the position shown in Figure 1 to cause notch 17 to engage the frame. This holds the impaling spikes 15 elevated out of the way. Dirt is now placed around the ball to shut off entrance of light and the trigger plate 18 is adjusted so the ball makes contact therewith. Now, arm 26 is quickly pressed inward to cause barb 32 to engage pin 31. In pushing arm 26 inward the extension 28 bears on the cam surface 29, thus pushing rod 11 aside to cause shoulder 17 to be released from the frame, and as the rod 11 lowers the extension 28 engages shoulder 17 to hold the rod elevated against the spring tension. The trap now is set. When the mole, in rooting through the debris, raises the ball 25, it in turn raises plate 18 to raise pin 31 out of the notch in barb 32 thus releasing arm 26 for counter clockwise rotation about pin 27. The spring pulls rod 11 down thus causing extension 28 to shift out of notch 17, and the rod and spikes descend to impale the mole. A notch 33 in the rod allows the arm 26 to lie adjacent the frame in sprung position.

When setting the trap over a deep burrow, a larger hole is dug down to the burrow and the earth is then returned to fill this hole, and the trap is set as before described with the ball 25 in simultaneous contact with the earth and the plate 18. The burrow of the mole is blocked with earth, and as the mole roots into the blockade it raises the loose earth above, thus raising the ball and plate to spring the trap.

The provision of the filler piece 25 insures intimate contact with the trigger plate and insures that even small uplift movements of the earth under the trigger plate will be transmitted to the trigger plate to spring the trap. The ball is not tightly packed in the earth so that it is easily forced upward by the mole. Although a soft ball is employed, the ball is not so soft as to deform easily, and readily transmits the thrust of the mole to the trigger mechanism. The long lever 26 provides a highly sensitive trigger capable of restraining a strong spring, yet responsive to a very small lift of plate 18 and its pin 31 to spring the trap.

It will be understood that if desired, the ball 25 may be held by any other means which allows free vertical movement thereof, or it may be entirely free, in which case the cup 23 prevents the ball from rolling out from under the trigger plate.

I claim as my invention:

1. An improvement in a mole trap of the type having a frame, an earth anchor on said frame adapted to be pushed into the earth alongside a mole burrow, a mole capturing mechanism operatively arranged on the frame in position to penetrate said burrow when sprung and a trigger mechanism arranged on the frame in position to extend over and adjacent said burrow when the capturing mechanism is operatively arranged, comprising: a spacer connected to the trigger mechanism for relative universal movement, said spacer being carried by the trigger mechanism in position to extend from the trigger mechanism downwardly through a top opening in said burrow into a mole obstructing position within said burrow and to cause the trigger mechanism to be released when said spacer is moved by a mole.

2. The trap of claim 1 wherein said spacer comprises a ball loosely attached to said trigger mechanism.

References Cited in the file of this patent

UNITED STATES PATENTS

| | | |
|---|---|---|
| 238,583 | Hales | Mar. 8, 1881 |
| 593,933 | Guertin | Nov. 16, 1897 |
| 1,757,063 | Stuesse | May 6, 1930 |
| 2,104,687 | Zahm | Jan. 4, 1938 |
| 2,471,804 | Wheeler | May 31, 1949 |
| 2,513,130 | Arnest | June 27, 1950 |